United States Patent [19]

Kubo et al.

[11] Patent Number: 4,710,894

[45] Date of Patent: Dec. 1, 1987

[54] ACCESS CONTROL SYSTEM FOR STORAGE HAVING HARDWARE AREA AND SOFTWARE AREA

[75] Inventors: Kanji Kubo; Katsuro Wakai, both of Hadano, Japan

[73] Assignee: Hitachi, Ltd., Tokyo, Japan

[21] Appl. No.: 671,618

[22] Filed: Nov. 15, 1984

[30] Foreign Application Priority Data

Nov. 16, 1983 [JP] Japan ............................ 58-215555

[51] Int. Cl.$^4$ ............................................. G06F 12/06
[52] U.S. Cl. ................................................ 364/900
[58] Field of Search ... 364/200 MS File, 900 MS File

[56] References Cited

U.S. PATENT DOCUMENTS

| | | | |
|---|---|---|---|
| 4,037,209 | 7/1977 | Nakajima et al. | 364/200 |
| 4,038,645 | 7/1977 | Birney et al. | 364/200 |
| 4,173,783 | 11/1979 | Couleur et al. | 364/200 |
| 4,373,179 | 2/1983 | Katsumata | 364/200 |
| 4,451,884 | 5/1984 | Heath et al. | 364/200 |
| 4,456,954 | 6/1984 | Bullions, III et al. | 364/200 |
| 4,500,952 | 2/1985 | Heller et al. | 364/200 |
| 4,573,119 | 2/1986 | Westheimer et al. | 364/200 |

Primary Examiner—Emanuel S. Kemeny
Assistant Examiner—Randy W. Lacasse
Attorney, Agent, or Firm—Antonelli, Terry & Wands

[57] ABSTRACT

An access control system for controlling the access to a storage which is divided into a hardware area inaccessible to ordinary programs and a software area for storing the ordinary programs, includes an address registration device and access controller. The address registration device has a plurality of entries, each of which holds a previously-used address of the storage and a flag for indicating whether the previously-used address is included in the hardware area or not. Further, the address registration device indicates whether an address at which the storage is to be accessed, is present in the address registration device or not. The access controller controls the access to the storage in accordance with the flag from the address registration device, a signal indicative of whether the to-be-accessed address of the storage is present in the address registration device or not, and the access mode which is now used.

6 Claims, 4 Drawing Figures

| INPUT | | | OUTPUT | MEANING |
|---|---|---|---|---|
| HA ACCESS MODE BIT | F BIT | OUTPUT OF COMPARATOR | | |
| X | X | 0 | 0 | NOT IN TLB |
| X | 0 | 1 | 0 | ACCESS ALLOWED |
| 0 | 1 | 1 | 1 | ADDRESSING EXCEPTION IN HA ACCESS |
| 1 | 1 | 1 | 0 | ACCESS ALLOWED |

ACCESS CONTROL SYSTEM FOR STORAGE HAVING HARDWARE AREA AND SOFTWARE AREA

The present invention relates to an access control system for a storage having an area for hardware and an area for software.

In recent years, a data processing system has achieved in which a storage, for example, a main storage has not only a software area (hereinafter referred to as "SA") for storing ordinary programs but also a hardware area (hereinafter referred to as "HA") which is inaccessible to the ordinary programs and used only by hardware. Usually, the SA includes addresses lower than a boundary address, and the HA includes addresses higher than the boundary address. Ordinary programs are stored in the SA, and information used by the hardware of a data processing system (that is, hardware information) is stored in the HA.

In order to achieve such a data processing system, a device is required which inhibits the ordinary programs from accessing the HA. A Japanese patent application Laid-open No. 56-124952 discloses a system for inhibiting ordinary programs from accessing the HA. According to this system, a boundary address for partitioning a main storage into an SA and an HA is previously set in a register, and an address at which the main storage is to be accessed, is compared with the boundary address by means of a comparator. In the case where the system is operated in the HA access mode, the access to the main storage is allowed, even when the to-be-accessed address of the main storage is greater in address number than the boundary address. However, in the case where the the access mode of the system is not in the HA access mode, when it is judged by the comparator that the to-be-accessed address of the main storage is greater in address number than the boundary address, the addressing exception occurs, and the access to the main storage is inhibited.

Such addressing-exception detecting means is provided on both the central processing unit side and the storage controller side, for the following reasons. In general, a storage controller is connected to an input/output processor as well as to a central processing unit. In order to check the HA access from the input/output processor, it is necessary to provide the addressing-exception detecting means in the storage controller. On the other hand, when the addressing-exception detecting means in the storage controller is used for checking the HA access from the central processing unit, the time necessary for detecting the addressing exception becomes long, and thus it is impossible to carry out an interrupt action successfully. Therefore it is necessary to provide the addressing-exception detecting means in the central processing unit.

Further, in the case where the HA is divided into sub-areas and the sub-areas are separated from each other in the main storage, it is necessary to provide two boundary registers (for start and end addresses of sub-area) and two comparators (for start and end addresses of sub-area) for each of the sub-areas. That is, the number of boundary registers (or comparators) required is twice as large as the number of hardware sub-areas, and thus the amount of hardware is greatly increased.

An object of the present invention is to provide an improved access control system for storage.

Another object of the present invention is to provide an access control system capable of simplifying the addressing-exception detecting means.

In order to carry out the translation of a logical address into a real address at high speed, a data processing system includes a translation lookaside buffer (hereinafter referred to as "TLB") for storing pairs of logical and real addresses which are frequently used. Further, in order to store a copy of data which is contained in a main storage and is frequently used, in a buffer storage (that is, a cache) and to utilize the above copy, the data processing system includes a buffer address array (hereinafter referred to as "BAA") for holding an address at which the above data is stored in the main storage.

According to the present invention, each entry of the TLB or BAA has a flag for indicating whether an address set in the entry is to be included in the HA or not. Thus, when the TLB is referred to in order to carry out the address translation, or when the BAA is referred to in order to access (to the buffer storage, the flag is read out from the TLB or BAA, and used for controlling the access to the main storage. The above and other objects, features and advantages of the present invention will be apparent from the following detailed description of the preferred embodiments of the invention in conjunction with the accompanying drawings, in which:

Figure 1:
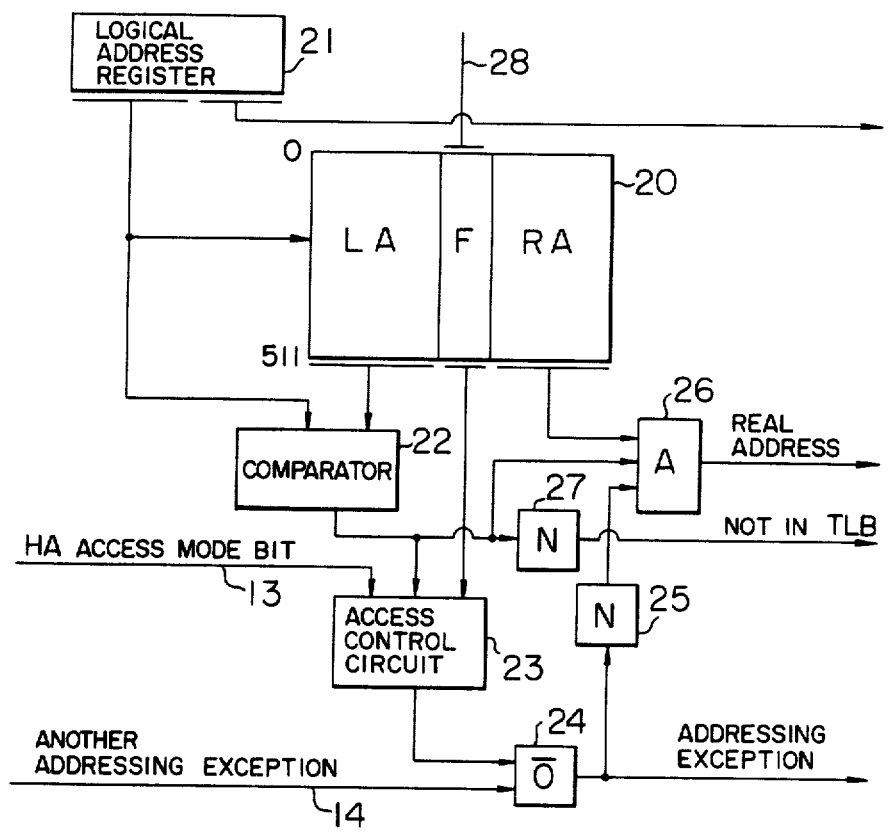
FIG. 1 is a block diagram showing an embodiment of the present invention.
Figure 2:
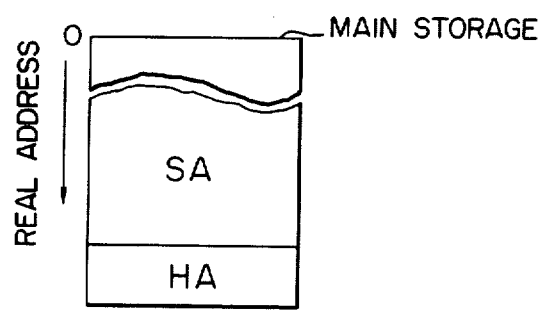
FIG. 2 is a schematic view showing the HA and SA of a main storage.

FIG. 1 is a block diagram of an embodiment of the present invention. Referring to FIG. 1, a TLB 20 has 512 entries whose addresses are assigned numbers 0 through 511, by way of example. Each entry of the TLB 20 includes a flag (that is, an F bit) for indicating whether a real address in the entry is included in an HA or not, in addition to the real address and a logical address. The F bit takes a value "1" or "0" according to whether the real address in the entry is to be included in the HA or SA, respectively. FIG. 2 shows a main storage, which is divided into an SA having lower addresses and an HA having higher addresses.

Referring back to FIG. 1, a logical address which is given when the access to the main storage is requested, is set in a logical address register 21. A predetermined logical operation (namely, hashing) is performed for upper bits of the logical address register 21, and nine bits of the logical address bits of the logical address register 21 are used to access the TLB 20, that is, to read out an entry thereof. A comparator 22 compares a logical address read out from the TLB 20 with upper bits of the register 21 other than the bits used for accessing the TLB 20, and outputs a logical value "1" when the upper bits of the register 21 coincide with the read-out logical address. That is, when the output of the comparator 22 takes a level "1", a real address corresponding to the logical address set in the logical address register 21 is present in the TLB 20. This is called "In TLB". While, the comparator 22 outputs a logical value "0" when the above-mentioned inputs of the comparator 22 do not coincide with each other. That is, when the output of the comparator 22 takes a level "0", the real address corresponding to the logical address set in the register 21 is absent in the TLB 20. This is called "Not in TLB". In this case, a signal indicating the "Not in TLB" state is delivered from an inverter 27.

The output of the comparator 22 is applied to an access control circuit 23, together with an F bit which is read out from an entry of the TLB 20 where the above real address exists. The access control circuit 23 is further supplied with an HA access mode bit from a signal line 13. The bit from the signal line 13 takes a value "1" when the data processing system is operated in the HA access mode, and takes a value "0" when the access mode of the system is not the HA access mode.

Figures 3, 4:
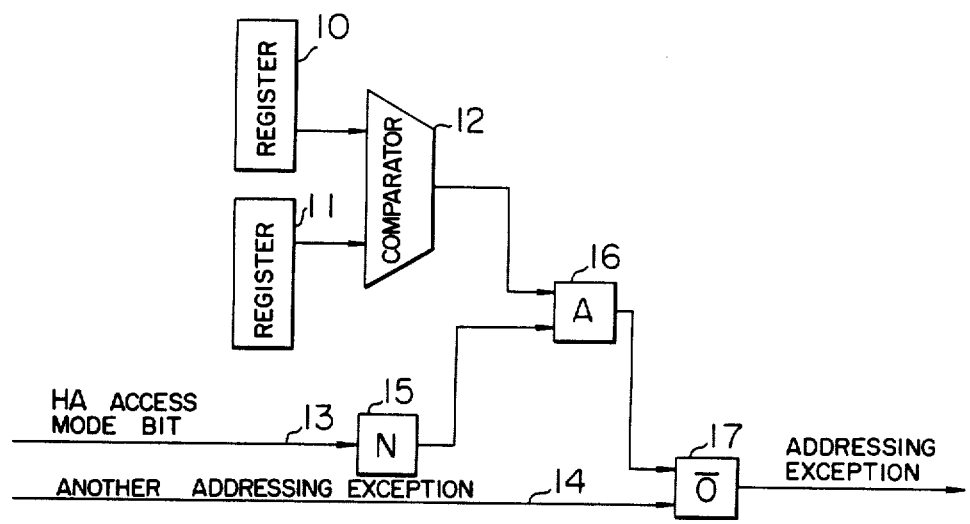
FIG. 3 shows a table for explaining the relation among the inputs and output of the access control circuit shown in FIG. 1.
FIG. 4 is a block diagram showing the addressing-exception detecting means which is provided in a storage controller.

FIG. 3 shows a table for explaining the operation of the access control circuit 23. That is, the meanings indicated by the combination of the inputs of the access control circuit 23 (namely, the HA access bit, the F bit, and the output of the comparator 22) and the output of the access control circuit 23 are listed in FIG. 3. Referring to FIG. 3, in the case where the output of the comparator 22 takes the level "0", the "Not in TLB" state is indicated. In this case, the output of the access control circuit 23 takes a level "0", irrespective of the values of the HA access mode bit and F bit. In the case where the output of the comparator 22 takes the level "1", and thus the "In TLB" state is indicated, the output of the access control circuit 23 and the possibility of access vary depending on the values of the HA access mode bit and F bit. That is, when the F bit takes the value "0", the access to the SA is indicated, and the output of the access control circuit 23 takes the level "0" irrespective of the value of the HA access mode bit. This indicates that the "In TLB" state is utilized and the access to the main storage is allowed, as will be explained later. When the F bit takes the value "1", the output of the access control circuit 23 and the possibility of access vary depending upon the value of the HA access mode bit. In more detail, when the HA access mode bit takes the value "1", it is indicated that the data processing system is operated in the HA access mode and the HA is to be accessed, and the output of the access control circuit 23 takes the level "0". That is, the "In TLB" state is utilized, and the access to the main storage is allowed. However, when the HA access mode bit takes the value "0", the access to the HA is required to be in the state that the access mode of the system is not the HA access mode, and the output of the access control circuit 23 takes a level "1".

Referring again to FIG. 1, the output of the access control circuit 23 is applied to an OR circuit 24, together with a signal which is supplied by a signal line 14 and indicates another addressing-exception generated in the data processing system. When the output of the access control circuit 23 takes the level "1", the OR circuit 24 delivers an output having the level "1", that is, an addressing-exception signal. The output of the OR circuit 24 is also applied to an AND circuit 26 through an inverter 25. When the output of the OR circuit 24 takes the level "1", the AND circuit 26 is closed, and therefore prevents the real address read out of the TLB 20 from being transferred to the main storage. In the case where the output of the access control circuit 23 takes the level "0" in the "In TLB" state, the real address read out of the TLB 20 is delivered through the AND circuit 26. The real address thus delivered is combined with lower address bits of the logical address register 21. The resultant address is sent to a storage controller, and then transferred to the main storage to be used for accessing the main storage.

In the case when the "Not in TLB" state occurs, an address translation step is started, and a new pair of logical and real addresses is registered in the TLB 20. The above address translation step is well known, and therefore further explanation thereof will be omitted. When the new address pair is registered in the TLB 20, an F bit which is supplied from the storage controller through a signal line 28, is registered in an entry of the TLB where the new address pair is set. That is, the storage controller includes addressing-exception detecting means shown in FIG. 4, and it is checked in the above-mentioned address translation step whether the registered real address is included in the HA or not.

Referring to FIG. 4, when the access to the main storage is requested, an address of the main storage which is to be accessed, is set in a register 10. On the other hand, a boundary address for partitioning the main storage into the HA and SA is previously set in a register 11. A comparator 12 compares the contents of the register 10 with those of the register 11, and delivers an output having the level "1" or "0" depending upon whether the to-be-accessed address of the main storage is greater or not greater in address number than the boundary address, respectively. The potential of the signal line 13 is kept at the level "1" when a data processing system is operated in the HA access mode, and is kept at the level "0" when the access mode of the system is not the HA access mode. When the potential of the signal line 13 takes the level "0", the output of an inverter 15 takes the level "1". At this time, if the output of the comparator 12 takes the level "1", the output of an AND circuit 16 takes the level "1", and thus the output of an OR circuit 17 also takes the level "1". This indicates that the HA is accessed in the state where the access mode of the system is not the HA access mode. That is, the addressing exception occurs, and the access to the main storage is inhibited. The potential of the signal line 14 is set to the level "1" when another addressing exception occurs.

When a pair of logical and real addresses is registered in the TLB 20, the output of the comparator 12 is reflected on the signal line 28 of FIG. 1.

According to the present embodiment shown in FIGS. 1 and 3, in the case where the output of the access control circuit 23 takes the level "1", processing for addressing exception is initiated. However, the case may be treated as not being the addressing exception state but the "Not in TLB" state. When this case is treated as the "Not in TLB" state, the same operation as in the previously-mentioned "Not in TLB" state is performed.

In the foregoing explanation, each of those entries of the TLB 20 which contain address pairs, has a flag for indicating whether the real address in the entry is included in the HA or not. However, in the case where the buffer storage system is used, the same flag as above-mentioned is provided in each of the entries of the so-called buffer address array (namely, the BAA) for holding addresses at which data identical with those set in a buffer storage are stored in the main storage.

As is evident from the foregoing explanation, according to the present invention, the TLB or BAA is utilized ingeniously, and therefore the amount of hardware can be reduced. Specifically, in the case where the HA is divided into sub-areas and these sub-areas are separated from each other in the main storage, or in the case where a number of central processing units are connected to a single storage controller, the present invention can reduce the amount of hardware in a marked degree.

In general, the TLB and BAA are constructed so as to permit a high-speed read operation. Accordingly, the addressing exception with respect to the HA access can be detected at high speed. In the "Not in TLB" state or "Not in BAA" state, it is necessary to use the addressing-exception detecting means included in the storage controller, and therefore time necessary to detect the addressing exception becomes long. However, the probability of the "Not in TLB" state or "Not in BAA" state is far lower than the probability of the "In TLB" state or "In BAA" state. Accordingly, the processing speed of a data processing system is not significantly affected by the "Not in TLB" state and "Not in BAA" state.

I claim:

1. An access control system for storage, adapted to be used in a data processing system in which a storage is divided into a hardward area inaccessible to ordinary programs and a software area for storing the ordinary programs, and in which the access to said storage is controlled in accordance with an address which accesses said storage and an access mode which indicates whether said data processing system is accessible to the hardware area or not, said access control system comprising:

addressing registration means having a plurality of entries, for reading out the contents of an entry corresponding to an address at which said storage is to be accessed, each of said entries containing a previously-used address of said storage and a flag for indicating whether said previously-used address is included in said hardware area or not, said address registration means including means for outputting a signal which indicates whether said to-be-accessed address of said storage is present in said address registration means or not, on the basis of the outputted contents of said entry; and access control means for controlling the access to said storage, in accordance with the access mode of said data processing system, said flag, and said signal from said address registration means.

2. An access control system according to claim 1, wherein said data processing system uses an address translation method in which a logical address is translated into a real address to access said storage, and wherein said address registration means is an address translation buffer for holding a pair of logical and real addresses in each entry thereof, and said acces control means includes output means for controlling the output of a real address read out of said address registration means.

3. An access control system according to claim 2, wherein said access control means indicates an addressing exception and said output means prevents a real address read out of said address registration means from being transferred, when the access mode of said data processing system is different from an access mode which is accessible to the hardware area, said flag indicates that said to-be-accessed address of said storage is included in said hardware area, and said signal from said address registration means indicates that said to-be-accessed address is present in said address registration means.

4. An access control system according to claim 2, wherein said access control means delivers a signal indicating that said to-be-accessed address of said storage is absent in said address registration means, when the access mode of said data processing system is different from said hardward access mode, said flag indicatas that said to-be-accessed address of said storage is included in said hardware area, and said signal from said address registration means indicates that said to-be-accessed address is present in said address registration means.

5. An access control system according to claim 4, further comprising register means for holding a boundary address between said hardware area and said software area, and comparison means for comparing said real address with said boundary address held in said register means and for outputting an addressing exception signal in accordance with the result of the comparision and the access mode of said data processing system.

6. An access control system according to claim 1, wherein said data processing system includes a buffer storage for holding a copy of data stored in said storage, and said address registration means is a buffer address array having a plurality of entries for holding addresses of data held in said buffer storage, thereby serving as the directory of said buffer storage.

* * * * *